United States Patent [19]

Rucker

[11] Patent Number: 5,233,949
[45] Date of Patent: Aug. 10, 1993

[54] TWO-STROKE CYCLE ENGINE HAVING LINEAR GEAR DRIVE

[76] Inventor: Richard D. Rucker, 5010 W. New World Dr., Glendale, Ariz. 85302

[21] Appl. No.: 966,865

[22] Filed: Oct. 26, 1992

Related U.S. Application Data

[63] Continuation-in-part of Ser. No. 769,782, Oct. 2, 1991, Pat. No. 5,158,046.

[51] Int. Cl.⁵ ............................................. F02B 75/02
[52] U.S. Cl. ............................. 123/71 R; 123/74 AE; 123/197.4
[58] Field of Search ............. 123/71 R, 74 AE, 197.4, 123/65 R

[56] References Cited

U.S. PATENT DOCUMENTS

| | | | |
|---|---|---|---|
| 1,011,032 | 12/1911 | Coles | 123/71 R |
| 2,010,170 | 8/1935 | Winfield | 123/74 AE |
| 4,936,269 | 6/1990 | Beaty | 123/74 AE |
| 5,076,456 | 11/1991 | Beachley et al. | 123/197.4 |
| 5,158,046 | 10/1992 | Rucker | 123/197.4 |

Primary Examiner—Willis R. Wolfe
Assistant Examiner—M. Macy
Attorney, Agent, or Firm—H. Gordon Shields

[57] ABSTRACT

A balanced motor two-stroke cycle engine having a linear drive includes a sealed gearcase secured to a cylinder housing having a plurality of concentric cylinders. The sealed gearcase includes a fixed ring gear, a pinion gear whose diameter is equal to the radius of the ring gear, a hub on which a piston rod is journaled for rotation, and two sets of counterweights. The piston rod moves in a linear fashion as the pinion gear rotates inside the fixed ring gear. The piston rod extends into the innermost cylinder, and a piston secured to the piston rod reciprocates linearly in the innermost cylinder. A chamber between the piston and the gearcase receives a flow of air and the air is transferred to the cylinder beneath the piston through a plurality of ports or apertures for compression. Fuel is injected into the cylinder from a pump chamber by a diaphragm that moves in response to air pressure in the cylinder beneath the piston.

16 Claims, 5 Drawing Sheets

TWO-STROKE CYCLE ENGINE HAVING LINEAR GEAR DRIVE

CROSS REFERENCE TO RELATED APPLICATION

This application is a Continuation in Part application of Ser. No. 07/769,782, filed Oct. 2, 1991, now U.S. Pat. No. 5,158,046, dated Oct. 27, 1992.

BACKGROUND OF THE INVENTION

1. Field of the Invention

This invention relates to two-stroke cycle engines, and more particularly, to a two-stroke cycle engine having a linear gear drive in which a piston rod unit moves linearly and which includes a sealed crankcase or gearcase.

2. Description of the Prior Art

A linear gear drive system is a relatively simple gear relationship which includes a fixed ring gear and a pinion gear rotating within the ring gear for converting reciprocating linear motion into a balanced rotary motion.

With linear motion of a piston rod unit, the typical piston wrist pin required for non-linear type reciprocating engines is eliminated. This allows a smaller, lighter weight piston to be assembled to a piston rod as a one-piece unit. Moreover, linear motion of a piston rod unit allows the cylinder to be sealed at its lower base and thus to be isolated from the crankcase or gearcase, and in fact this allows the cylinder to itself comprise two separate chambers, an upper chamber above the piston, and a second chamber below the piston and above the gearcase.

Operating in a two-stroke cycle mode, with linear motion of the piston rod unit, the operation and timing of the valves is simplified. The intake valve need only be a relatively simple check valve, such as a reed valve, or the like, although the mass of intake air would be greater if a mechanically operated valve is employed. Because operation is two stroke, valve timing and the corresponding mechanical control is relatively simple.

In prior art two stroke cycle engines, exhaust valves are typically ports covered and uncovered (closed and opened) by the piston itself. The exhaust valve, in the apparatus of the present invention, is operated from the center of the piston and piston rod assembly and it seats or extends into the cylinder head.

Linear motion of a piston rod is not a new motion. Rather, it is a relatively well-known hypocycloid type curve. A hypocycloid is a curve generated by a point on a circle when the circle is rolled inside a larger circle. When the diameter of the smaller circle is equal to the radius of the larger circle, or one half the diameter of the larger circle, the hypocycloid becomes a straight line. In actuality, every point on the smaller circle then moves in a straight line.

The same type of hypocycloid linear motion occurs when a small pinion gear is rotated inside of a fixed, internal or ring gear, with the pitch diameter of the internal gear twice that of the pinion gear. Any point on the pitch circle of the pinion moves in a straight line inside the internal gear.

U.S. Pat. No. 587,380 (Ziegler) discloses this type of linear motion in a pump using symmetrical gearing to distribute forces and to eliminate side thrust.

U.S. Pat. No. 1,056,746 (Pitts) discloses the same type of linear motion in which two pairs of counterbalances are utilized. One pair of counterbalances is on the output shaft and the other pair of counterbalances is on the pinion assembly, and inside the first pair of counterbalances.

The mechanical movement described in the ,746 patent was applied to an internal combustion engine by the same inventor. The internal combustion engine matured into U.S. Pat. No. 1,090,647.

U.S. Pat. No. 1,579,083 (Collins) discloses a similar linear gear movement in an opposed piston environment. Two pistons, aligned with each other and in cylinders on opposite ends of the gear system, are connected by aligned piston rods. The one set of gears and an output shaft are supported by the frame.

U.S. Pat. No. 2,886,976 (Dean) discloses various embodiments of systems for converting motion into linear movement.

U.S. Pat. No. 3,175,544 (Hughes) discloses internal combustion engines utilizing a slider mechanism for linear movement of piston rods and multiple pistons.

U.S. Pat. No. 3,258,992 (Hittell) discloses reciprocating piston engines utilizing a slider mechanism for linear movement and double opposed cylinders and pistons. That is, on a single crankshaft are at least two sets of piston rod units and each pair of piston rod units moves in opposed cylinders. In the basic environment, four cylinders are utilized.

U.S. Pat. No. 3,277,743 (Kell) discloses two different embodiments of linear motion mechanisms. The mechanical movement, or the mechanisms involved in mechanical movement, is disclosed in the ,743 patent. No particular reference to an engine, a pump, compressor, etc., is discussed.

U.S. Pat. No. 3,329,134 (Llewellyn) discloses an internal combustion engine with opposed pistons utilizing a slider mechanism for linear movement.

U.S. Pat. No. 3,563,223 (Ishida) discloses another reciprocating engine environment utilizing linear gear movement. Again, opposed pistons are utilized.

U.S. Pat. No. 3,744,342 (Kinoshita) discloses a reciprocating piston engine utilizing an internal gear and a piston and crank mechanism for balancing primary inertia forces. The internal gear, which is fixed, has twice the number of teeth as a gear which rotates with the balance weight.

U.S. Pat. No. 3,791,227 (Cherry) discloses counterweight balancing of linear movement in an engine apparatus. There is no discussion on a particular type of engine. Rather the patent discusses engines in general terms of mechanical movement.

U.S. Pat. No. 3,886,805 (Koderman) discloses a crank gear system for converting linear movement into rotary movement. The apparatus is disclosed in terms of a crank gear and planetary crankshaft system.

U.S. Pat. No. 4,078,439 (Iturriaga-Notario) discloses compressor apparatus utilizing a slider mechanism for linear movement of opposed piston and cylinder systems.

U.S. Pat. No. 4,173,151 (Grundy) discloses a slider mechanism for linear movement in an engine in which the pistons are offset from each other, as in a vee configuration. Several different embodiments are shown, utilizing different piston and cylinder arrangements, but all involving linear piston rod movement.

U.S. Pat. No. 4,237,741 (Huf et al) discloses a modified hypocycloid gear and a mechanical transmission system. Several different embodiments, including different types of internal combustion engines, are disclosed.

U.S. Pat. No. 5,067,456 (Beachley et al) discusses an internal combustion engine utilizing straight line piston rod movement. Details of the hypocycloid gearing structure to provide the straight line piston rod movement are discussed.

SUMMARY OF THE INVENTION

The invention described and claimed herein comprises a two-stroke cycle internal combustion engine utilizing linear movement of a piston rod in a cylinder and dynamic balancing of the reciprocating masses and includes a plate beneath the piston through which extend a plurality of holes or ports through which intake air flows into the cylinder and which ports are controlled by reed valves and which includes a fuel injection system having a diaphragm pump.

Among the objects of the present invention are the following:

To provide new and useful internal combustion engine apparatus;

To provide new and useful two-stroke cycle internal combustion engine apparatus;

To provide new and useful internal combustion engine apparatus utilizing linear piston rod movement;

To provide new and useful air supply apparatus for a two stroke cycle internal combustion engine;

To provide new and useful fuel injection apparatus for a two stroke cycle internal combustion engine;

To provide new and useful fuel injection apparatus having a diaphragm pump;

To provide new and useful two stroke cycle internal combustion engine apparatus having a piston moving in a cylinder and a plate beneath the piston and a plurality of ports in the plate through which intake air flows; and To provide new and useful combustion engine apparatus which includes a diaphragm controlled fuel injection system.

DESCRIPTION OF THE PREFERRED EMBODIMENT

Figures 1A, 1B:
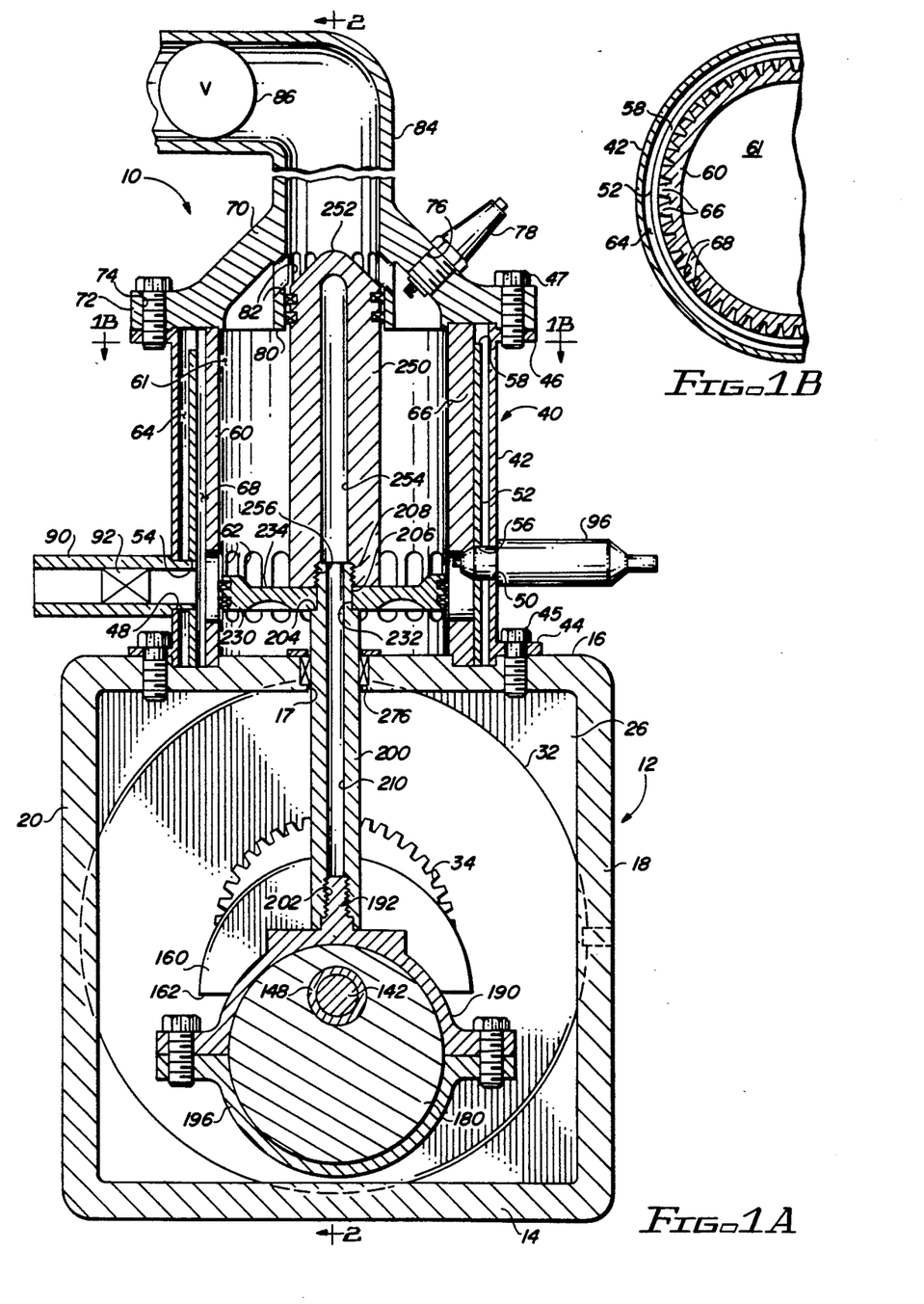
FIG. 1A is a view in partial section of the apparatus of the present invention.
FIG. 1B is a view in partial section taken generally along line 1B—1B of FIG. 1A.
Figure 2:
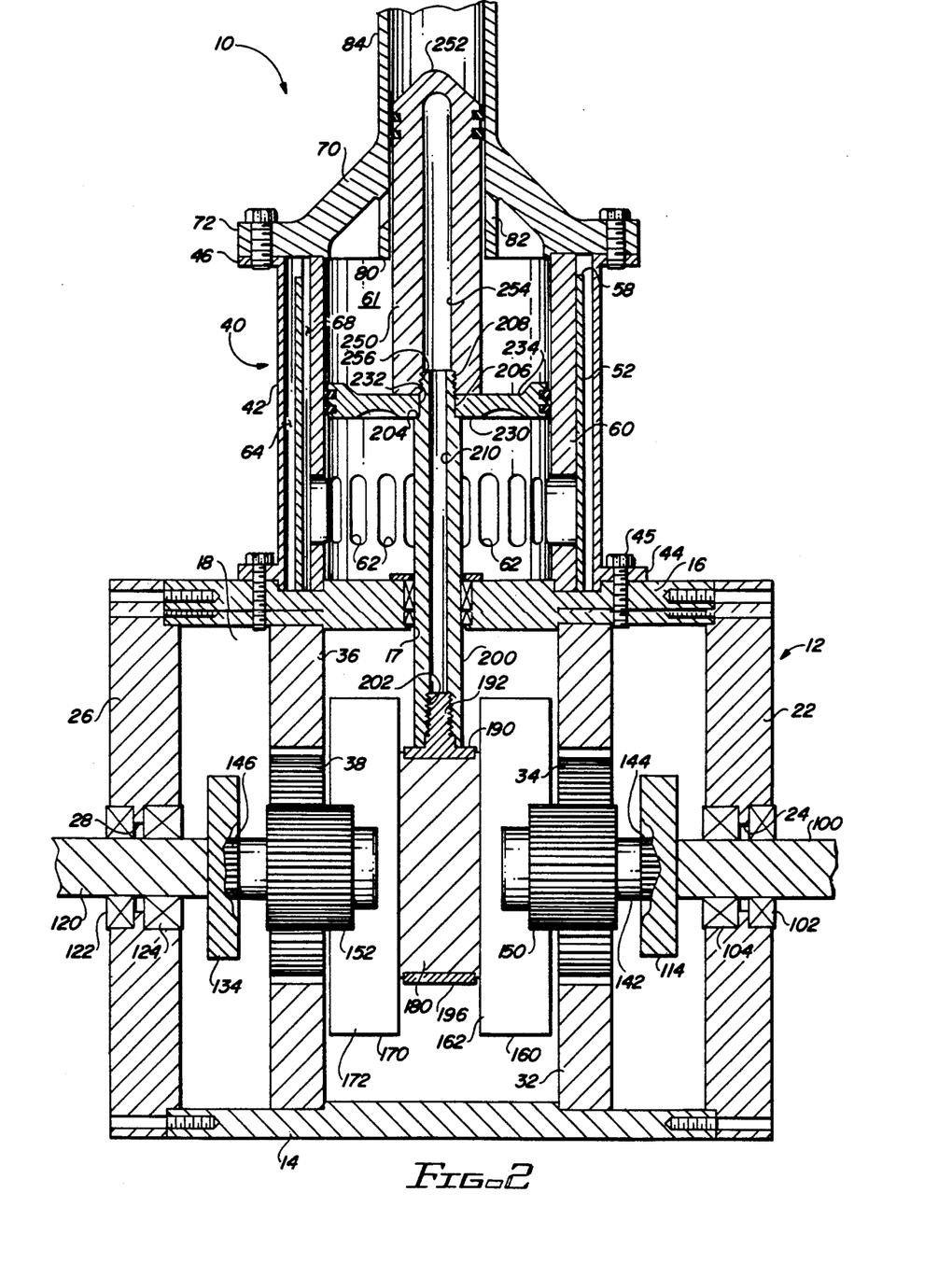
FIG. 2 is a view in partial section taken generally along line 2—2 of FIG. 1.
Figure 3:
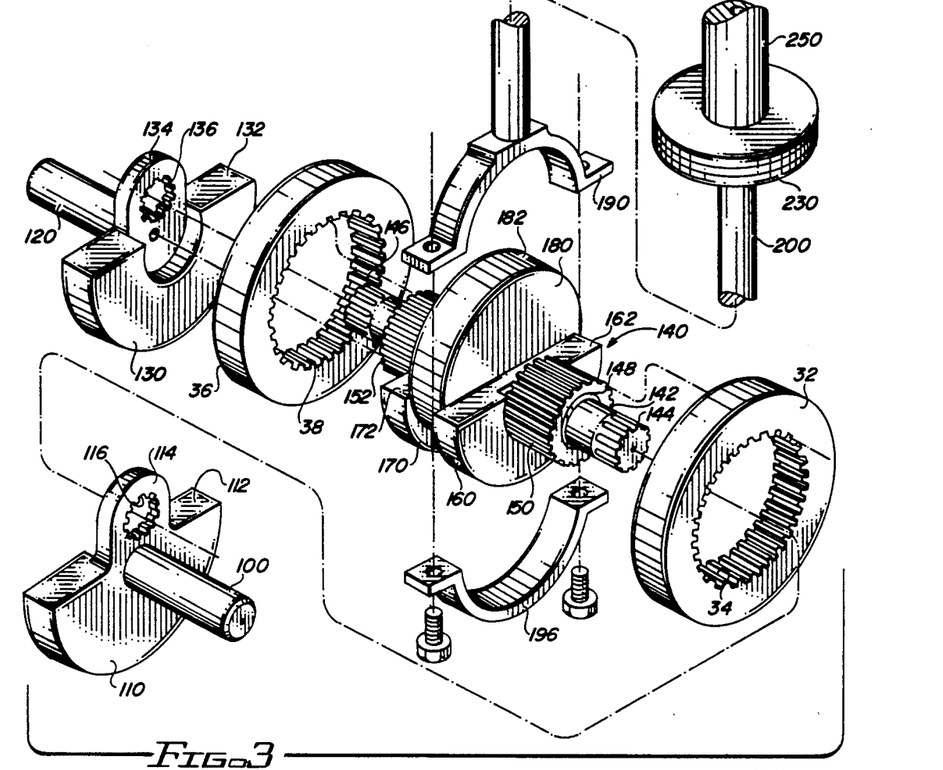
FIG. 3 is an exploded perspective view of a portion of the operating mechanism of the present invention.

FIG. 1A is a view in partial section through engine apparatus 10 of the present invention. FIG. 1B is a view in partial section through an upper portion of the engine apparatus 10 of FIG. 1A, taken generally along line 1B—1B of FIG. 1A. FIG. 1B illustrates the relationship among the three concentric cylinders of the apparatus 10. FIG. 2 is a view in partial section through the engine apparatus 10 taken generally along line 2—2 of FIG. 1A. However, some of the mechanical elements of engine apparatus 10 have been rotated through ninety degrees of rotation in FIG. 2 from where they are shown in FIG. 1A. This will be discussed in detail. FIG. 3 is an exploded perspective view of a portion of the engine apparatus 10 of FIGS. 1A, 1B, and 2. For the following discussion, reference will be made to FIGS. 1A, 1B, 2, and 3.

The engine apparatus 10 includes a gearcase 12. The gearcase 12 includes a bottom plate 14, a top plate 16, and a pair of side plates 18 and 20. The bottom plate 14, the top plate 16, and the side plates 18 and 20 are appropriately secured together, and may be from a single casting. This is best shown in FIG. 1A. As shown in FIG. 2, the gearcase 12 also includes a pair of end plates, including an end plate 22 and an end plate 26. The end plates each include a bearing aperture or bore extending through them. A bearing aperture or bore 24 extends through the end plate 22, and a bearing aperture or bore 28 extends through the end plate 26.

Disposed within the gearcase 12 is a pair of fixed gear plates 32 and 36. The gear plates 32 and 36 are generally parallel to the end plates 22 and 26 and are fixed to the top and bottom plates 16 and 14, respectively. The gear plate 32 includes an internal ring gear 34, and the gear plate 36 includes an internal ring gear 38. The plates 32 and 36 are substantially parallel to each other, and the ring gears 34 and 38 are accordingly substantially parallel to and aligned with each other on a common axis. The ring gears 34 and 38 are coaxial with the bores 24 and 28 in the end plates 22 and 26, respectively.

A cylinder assembly 40 extends upwardly from the gear case 12. The top plate 16 of the gear case 12 includes a central hole or aperture 17. The cylinder assembly 40 is appropriately disposed on and secured to the top plate 16 and is coaxially aligned with the hole or bore 17. The vertical or longitudinal axis of the cylinder assembly 40 intersects at a right angle to and at the mid point of the horizontal or central axis aligning gears 34 and 38.

The cylinder assembly 40 includes three coaxial cylinders 42, 52, and 60. The cylinder 42 is the outer cylinder, the cylinder 52 is the middle cylinder, and the cylinder 60 is the inner cylinder.

Extending outwardly from the bottom of the outer cylinder 42 is a plurality of bolt flanges 44. Cap screws 45 extend into the top plate 16 to secure the cylinder assembly 40 to the gearcase 12.

The outer cylinder 42 also includes a bolt flange 46 extending outwardly from the upper portion of the cylinder 42. The bolt flange 46 cooperates with bolts or cap screws 47 to secure a cylinder head 70 to the cylinder assembly 40. This will be discussed in detail below.

The cylinder 42 includes an air intake aperture 48. An air intake conduit 90 is appropriately secured to the cylinder 42 about the aperture 48.

Diametrically opposite to the air intake aperture 48 is a fuel injector aperture 50 in the cylinder 42. A fuel injector 96 is appropriately secured to the cylinder 42 in the aperture 50.

While fuel injectors, such as the injector 96, are illustrated in conjunction with the apparatus 10 and in conjunction with the other embodiments, of the present invention, it will be understood that carburetion may also be used with the different embodiments. Some circumstances, or with a particular embodiment and a specific use, either carburetion or fuel injection may be preferable.

The middle cylinder 52 is spaced apart from the outer cylinder 42 an appropriate distance. The space between the cylinders 42 and 52 comprises a transfer chamber 64, as will be discussed below.

An air intake aperture 54 extends through the cylinder 52. The aperture 54 is aligned with the aperture 48. The air intake conduit 90 extends to and is appropriately secured about the aperture 54.

A fuel injector aperture 56 extends through the cylinder 52 and is aligned with the aperture 50 in the outer cylinder 42. The fuel injector 96 also extends through the aperture 56.

The middle cylinder 52 terminates below the head 70 at a top rim 58. The space between the rim 58 and the head 70 provides communication between the chamber 64 and a series of chambers 68. Details of the chambers 68 are best shown in FIG. 1B. The series of chambers 68 are disposed between the middle cylinder 52 and the inner cylinder 60. The chambers 68 are spaces or flutes between vertically extending ribs or ridges 66 on the fluted exterior periphery of the cylinder 60.

The ribs or ridges 66 extend longitudinally with respect to the cylinder 60. The outermost portions of the ribs 66 contact the inner periphery of the middle cylinder 52 for heat transfer purposes as well as for defining a plurality of chambers 68 between the cylinders 52 and 60. The chambers 68 are actually longitudinally extending flutes on the exterior of the cylinder 60. The top rim 58 provides virtually unrestricted communication between the chamber 64 and the chambers 68 for the transfer of the air between the chambers.

The inner cylinder 60 includes a plurality of lower transfer apertures or ports 62 which communicate between the chambers 68 and an interior combustion chamber 61 within the cylinder 60.

The plurality of transfer ports 62 extend through the cylinder 60 and communicate with each of the flutes or chambers 68. The transfer ports 62 are located below the midpoint of the cylinder 60 and spaced upwardly from the gearcase 12. Preferably, the ports 62 are disposed about the entire periphery of the cylinder 60 to provide a relatively even distribution for transferring the partially compressed intake air into the cylinder 60 from the chambers 68. The fuel injector 96 is aligned with one of the ports 62, as shown in FIG. 1.

Secured to the upper portion of the cylinder assembly 40 is the cylinder head 70. The cylinder head 70 includes an outwardly extending flange 72 which mates with the flange 46 of the outer cylinder 42. The flange 72 includes a plurality of apertures 74 aligned with apertures extending through the flange 46, and a plurality of appropriate bolts or screws 47 extends through the aligned apertures to secure the cylinder head 70 to the cylinder assembly 40. Obviously, appropriate gaskets or other sealing elements are used to seal the cylinder head 70, the cylinders of the cylinder assembly 40, and likewise the cylinder assembly 40 and the top plate 16, and also the side plates 22 and 26 to the elements which comprise the gearcase 12.

Extending through the cylinder head 70 is a spark plug hole 76. The spark plug hole 76 is appropriately tapped to receive the threaded portion of a spark plug 78.

An exhaust cylinder 80 extends downwardly from the center of the cylinder head 70. A plurality of exhaust ports 82 extend through the exhaust cylinder 80. The exhaust cylinder 80 is coaxially aligned with an exhaust stack 84 which extends upwardly from the cylinder head 70. The exhaust stack 84 in turn may communicate with an appropriate muffler system, etc.

The external side of the inner cylinder 60 is grooved or fluted to form the ribs or intake transfer baffles 66. The middle cylinder 52 is secured to the external side of the cylinder 60, and against the exterior periphery of the ribs or baffles 66. Between the cylinder 52 and the baffles 66 is the plurality of chambers 68. The outer cylinder 42 is aligned coaxially with the cylinder 52 to form the chamber or intake plenum 64, as discussed above. The chamber 64 communicates with the chambers 68 by way of the opening above the rim 58, which extends for a full three hundred sixty degrees.

In the embodiment shown, fuel is added to the transferring intake air from the fuel injector 96 when a piston 230 is approximately at the bottom of its stroke. This helps to insure that the scavenging of exhaust gases is substantially accomplished by only air, rather than by a charge of fuel and air.

An intake valve 92 is disposed in the conduit 90. If desired, the valve 92 may be a mechanically or electrically operated poppet valve which provides the greatest volumetric efficiency. However, a reed valve may also be used, as desired. The employment of a particular intake valve or intake valve design is well known and understood in the art, and may be configured as desired. The employment of a specific intake valve is not a part of the present invention, since such elements are well known and understood in the art.

An output shaft 100 extends through the bore or aperture 24 in the end plate 22. Disposed within counter bores in the bore 24 are an outer oil seal 102 and an inner bearing 104.

A shaft counterweight 110 is appropriately secured to the output shaft 100. The shaft counterweight 110 is generally in the form of a half circle, with the shaft 100 extending outwardly from the diametrical center of the half circle. The counterweight 110 includes a front face 112. Extending outwardly from the front face 112 is a hub portion 114. The hub portion 114 includes an internally splined portion or bore 116. The internally splined portion or bore 116 is offset from, but generally parallel to, the axis of rotation of the shaft 100.

Extending through an aperture 28 in the end plate 26 is a timing shaft 120. The timing shaft 120 extends through an outer oil seal 122 and an inner bearing 124. The oil seal 122 and bearing 124 are appropriately disposed in counterbores in the end plate 26 and are coaxial with the bore or aperture 28.

A shaft counterweight 130 is secured to the timing shaft 120. The shaft counterweight 130 is substantially identical to the shaft counterweight 110, and is generally parallel thereto. The shaft counterweight 130 includes a front face 132 and a hub portion 134 that extends outwardly from the front face 132. An internally splined bore 136 extends through the hub portion 134. The splined bore or splined portion 136 is generally aligned with the internally splined bore 116 of the shaft counterweight 110.

A pinion shaft 142 extends between the shaft counterweight 110 and the shaft counterweight 130 and extends into the internally splined portions 116 and 136 of the counterweights 110 and 130 to couple the counterweights together for common or joint rotation. The coupling accordingly provides for the common rotation of the shafts 100 and 120.

The pinion shaft 142 is rotatably disposed within a pinion assembly 140. The assembly 140 extends through the fixed ring gears 34 and 38 and will be discussed in more detail below. The pinion assembly 140 is best shown in FIG. 3. Portions of it, are, of course, also shown in FIGS. 1 and 2.

The pinion shaft 142 rotates within the pinion assembly 140 on a bushing 148. The shaft 142 includes two ends, both of which are splined. One end of the shaft 142 includes external splines 144 which mate with the internal splines 116 of the shaft counterweight 110 to couple the output shaft 100 to the pinion shaft 142. The opposite end of the shaft 142 includes external splines 146. The splines 146 mate with the internal splines 136 of the shaft counterweight 130. The splined connection of the splines 136 and 146 couples the timing shaft 120 to the pinion shaft 142.

Adjacent to the splined end 144 of the shaft 142, but spaced apart longitudinally from the splines, is a pinion gear 150. The pinion gear 150 meshes with and rides in the ring gear 34 of the gear plate 32. Near the opposite end of the shaft 142, and adjacent to the splines 146, but spaced apart longitudinally from the splines 146, is another pinion gear 152. The pinion gear 152 meshes with and rides in the internal ring gear 38 of the gear plate 36. The pinion gears 150 and 152 are obviously aligned with each other.

Adjacent to the pinion gear 150 is a counterweight 160. The counterweight 160 is, like the counterweights 110 and 130, in the general configuration of a half circle. The counterweight 160 includes a flat face 162.

Adjacent to the pinion gear 152 is a counterweight 170. The counterweight 170 is substantially identical to and aligned with the counterweight 160. The counterweight 170 includes a flat face 172 which is aligned generally parallel to the flat face 162 of the counterweight 160.

Between the counterweights 160 and 170 is a grooved journal hub 180. The journal hub 180 is connected to the piston 230, as discussed below. The pinion gears 150 and 152, the pinion counterweights 160 and 170, and the journal 180 are preferably made in a single unit (or machined from a single casting), with a bore extending through the unit coaxially aligned with the pinion gears. The bushing 148 is disposed in the bore, and the shaft 142 is rotatably disposed in the bushing. The bushing 148, the pinion gears 150 and 152, the counterweights 160 and 170, and the journal 180 comprise the pinion assembly 140.

The pinion counterweights 160 and 170 are disposed on the pinion gears 150 and 152 to counterbalance a piston and rod assembly relative to the centerline of pinion shaft 142. The pinion counterweights 160 and 170 are similar to the shaft counterweights 110 and 130, and are generally aligned therewith, but rotate in opposite directions.

The pinion journal hub 180 is disposed between the pinion counterweights 160 and 170. The center axis of hub 180 intersects at a right angle the pitch circle of pinion gears 150 and 152. With the pinions 150 and 152 rigidly connected to the counterweights 160 and 170 and to the hub 180, it will be seen that rotary movement of the hub 180 will cause the joint rotation of the counterweights 160 and 170. Rotary movement of the pinion assembly 140 and its pinion gears 150 and 152 will also occur.

Disposed within the inner cylinder 60 of the cylinder assembly 40, and extending through an appropriate oil wipe and pressure seal 276 in the aperture 17 of the top plate 16, is a piston rod 200. The piston rod 200 extends into the gearcase 12. The piston rod 200 is of a tubular configuration, and it includes an internally threaded portion 202 at the bottom or lower end of the rod 200.

The internally threaded portion 202 of the piston rod 200 is secured to an externally threaded boss 192 of a rod bearing 190. The rod bearing 190 is secured about the journal hub 180 by cap 196 using any appropriate fasteners, such as cap screws, in a well known and understood manner.

At the top of the piston rod 200 there is a shoulder 204 and an upwardly extending portion 206 above the shoulder 204. At the top of the upper portion 206 is an externally threaded portion 208. Within the piston rod 200, and extending substantially its full length, is a bore 210.

A bore 232 extends through the piston 230. The top or upper portion 206 of the piston rod 200 extends through the bore 232 with the upper threaded portion 208 extending above the piston 230. The piston 230 is disposed on the top shoulder 204 of the piston rod 200 within the cylinder 60. An exhaust valve rod 250 is secured to the threaded portion 208 of the rod 200 and secures the piston 230, the rod 200, and the rod 250 together. If desired, the piston 230 and the piston rod 200, and an exhaust valve rod 250, may be made in one piece.

The piston rod 200 is secured to the rod bearing 190 through the connection of the internally threaded bottom portion 202 with a threaded boss 192. The journal or rod bearing 190 in turn fits around the pinion journal hub 180 in a circumferentially extending groove 182. The rod bearing cap 196 mates with, and is appropriately secured to, the rod bearing 190 in the groove 182 about the journal hub 180.

Extending downwardly from the top of the piston 230 is a dish-shaped depression which includes a flat bottom 234. Appropriate seal rings, which are preferably self-lubricating, etc., are disposed about the periphery of the piston 230.

An exhaust valve rod 250 extends upwardly through the cylinder 60 and is appropriately secured to the piston rod 200. The bottom of the valve rod 250 is disposed on the flat bottom 234 of the depression on the top of the piston 230. Within the rod 250 is a bore 254. At the bottom end of the bore 254 is an internally threaded portion 256 which appropriately mates with the externally threaded portion 208 of the piston rod 200. The valve rod 250 accordingly secures the piston 230 to the piston rod 200, and is in turn itself secured to the piston rod 200.

The valve rod 250 is generally cylindrical and is movably disposed within an exhaust cylinder 80. The exhaust cylinder 80 comprises a coaxially aligned cylinder portion of the cylinder head 70. The exhaust cylinder 80 includes a plurality of exhaust ports 82 below the cylinder head 70, and an upwardly extending exhaust stack 84 above the cylinder head. In FIG. 1, the valve rod 250 is positioned at the lower end of the exhaust cylinder 80, thus uncovering the exhaust ports 82 to provide communication between the cylinder 60 and the exhaust stack 84 through the exhaust ports 82.

A valve 86 is schematically represented as being disposed in the exhaust stack 84. The valve 86 may be a controller poppet valve or butterfly valve, etc.

The purpose of the valve 86 is to allow the exhaust stack 84, or essentially the exhaust ports 82, to be restricted, if necessary, before the transfer ports 62 are closed by the upward movement of the piston 230. Thus, only the exhaust gases are vented, and not a significant portion of the incoming charge of air or air and fuel.

The restriction of the exhaust ports (or stack) may also be controlled by a controlled telescoping exhaust stack, not shown. In whatever manner the restriction of the exhaust ports or stack is controlled, the intent is to match or time the exhaust flow with the transfer flow of air into the chamber 61 of the cylinder 60 at various operating speeds so that only the exhaust gases flow out of the cylinder and not a significant portion of the fresh incoming charge of air.

The valve rod 250 includes a generally pointed and closed top 252. An interior bore 254 extends the full length of the rod from a lower threaded portion 256 to the top 252. The bore 254 communicates directly with the interior bore 210 of the piston rod 200. The bore 254 is essentially non-functional, serving only to lighten the weight of the rod 250, the rod 200, and the piston 230, all of which are secured together.

It will be noted that the exterior diameter of the rod 250 is substantially greater than that of the rod 200. The reason is, of course, that the upper portion of the rod 250 functions as a valve in the exhaust cylinder 80 and the stack 84.

Appropriate sealing elements, preferably self-lubricating, rings, extend about the top of the rod 250, below the point or end 252. In FIG. 1, the piston 230 is shown at its lowest point. The upper portion of the rod 250 is within the exhaust cylinder 80. A portion of the rod 250 remains in the exhaust cylinder 80 at all times as it moves to cover and uncover the exhaust ports 82.

In FIG. 2, the exhaust valve rod 250 is shown moved upwardly, above the exhaust ports 82, blocking the communication between the cylinder 60 and the exhaust stack 84.

In FIG. 1, the piston 230 is at the bottom of its stroke, and the exhaust ports 82 are open to allow the combustion gases or exhaust gases to flow from the upper or combustion chamber 61 of the cylinder 60 upwardly and outwardly through the exhaust stack 84. It will be noted that the flow of the intake air and exhaust gases is uniflow, or in one direction only, namely upwardly from the transfer ports 62 and outwardly through the ports 82 into the exhaust stack 84.

The piston 230 is shown in FIG. 1 providing communication from the intake plenum 64 and from the portion of the cylinder 60 beneath the piston 230 to the chamber 61 above the piston 230 through the transfer ports 62. As the piston 230 moves up to its mid position as shown in FIG. 2, the transfer ports 62 are blocked from communicating with the portion of the chamber 61 above the piston, thus allowing the piston 230 to compress the fuel and air charge further as it moves upwardly.

The exhaust rod 250 is shown in FIG. 2 above the exhaust ports 82, thus sealing the cylinder 60 above the piston 230. While the piston 230 moves upwardly, and after passing the intake ports 62, the vacuum or low pressure created in the lower portion of the chamber 61 and cylinder 60 below the piston 230 causes air to be drawn into that chamber through intake conduit 90, intake valve 92, and transfer ports 62.

At the appropriate time, with respect to the location of the piston 230, the spark plug 78 fires, igniting the compressed fuel and air mixture above the piston 230 within the cylinder 40. Timing for the spark plug 78 is not shown, since such is well known and understood. Similarly, as has been stated above, if a poppet valve or some other type of valve other than a reed valve is used for the intake valve 92 in the intake conduit 90, the control of that valve also needs to be mechanically provided for. Again, the valve timing elements are well known and understood in the art, and need not be shown in detail herein.

From the power generated during combustion, the piston 230 is moved downwardly by the expanding gases. When the exhaust rod 250 opens the ports 82, the exhaust gases flow upwardly through the exhaust ports 82 and upwardly through the exhaust stack 84 and outwardly from the engine apparatus 10.

As the piston 230 moves downwardly, the air beneath the piston is compressed in a precompression step well known and understood in the two-stroke cycle engine art. Obviously, the valve 92 closes to prevent the air charge from flowing back out through the intake conduit 90. Instead, the air charge flows through the intake transfer chamber 68 and past or along the baffles 66 where it absorbs heat from the wall of the cylinder 60. The transfer of heat provides a degree of cooling for the combustion chamber 61. At the same time, the heat transfer does not diminish the volumetric efficiency of the engine apparatus 10. The mass of the intake charge of air is not lessened by the heat transfer, but a cooling effect occurs for the upper portion of the cylinder 60. The air then flows into the intake plenum 64 through the transfer slot defined between the top 58 of the cylinder 52 and the cylinder head 70.

The contacts between the ribs 66 of the inner cylinder 60 with the middle cylinder 52 facilitates the heat transfer from the inner cylinder 60 to both the middle cylinder and to the air flowing in the flutes 68 and in the transfer chamber 64 between the outer cylinder 42 and the middle cylinder 52.

The momentum of the engine causes the downstroke to move over center, and the piston 230 then moves upwardly on its compression stroke. As is known and understood in the two stroke cycle engine art, the downstroke is considered the power and the exhaust/transfer stroke, and the upstroke is considered the intake and compression stroke.

As the piston 230 moves downwardly and valve rod 250 clears the top of exhaust ports 82, the exhaust gases begin their upward flow out of the combustion chamber 61 within the cylinder 60. As soon as the piston 230 clears the top of the ports 62, the ports 62 comprise transfer ports for transferring the partially compressed air from beneath the piston 230 and from the intake plenum 64 and the chambers 68 upwardly into the upper portion of the cylinder 60 above the piston 230. With the exhaust gases having been scavenged by plenum air, fuel is injected by the injector 96 at this time so as to prevent the loss of unburned fuel through the exhaust ports. This timing of the injection of fuel also minimizes fuel condensation.

As the piston 230 moves above the ports 62, the upper portion of the cylinder 60 is again sealed from the lower portion of the cylinder 60. By this time, the valve rod 250 has also closed the exhaust ports 82, thus effectively sealing the chamber 61 above the piston 230. The air and fuel mixture above the piston 230 is then compressed preparatory to the firing of the spark plug 78.

After the firing of the spark plug, the cycle begins again as the piston 230 starts to move downwardly. The cycle then repeats itself, with the appropriate timing of the valve 92 and of the injection of the fuel by the fuel injector 96, and the firing of the spark plug 78, as required.

The piston rod or connecting rod 200 is appropriately sealed in the top plate 16 so that there is no communication between the cylinder assembly 40 and the interior of the gearcase 12. Essentially, this prevents contamination of the atmosphere within the gearcase 12 by the fuel-air mixture within the cylinder 60 and by the exhaust gases.

There are essentially two separate and sealed chambers in the cylinder 60, including a chamber beneath the piston 230 and above the plate 16, and the chamber above the piston 230 and beneath the cylinder head 70. Any piston blow-by from the upper chamber, which comprises the combustion chamber, is captured or trapped in the lower chamber beneath the piston and is recirculated back into the upper, combustion, chamber. The gear case 12 comprises a chamber sealed and separate from both chambers in the cylinder 60.

The sealed gear case 12, separate from the cylinder assembly 40, also provides an insulating function to protect the gear elements from the heat generated by the combustion process. With the fresh charge of air admitted beneath the piston 230, and accordingly in the lower chamber of the cylinder 60, there is an element of cooling or insulating that helps to protect the gear case 12 and its elements from the heat generated by the combustion processes in the upper chamber of the cylinder 60.

In most prior art two stroke cycle engines, precompression is accomplished within the crankcase or open area beneath the piston, and oil must accordingly be mixed with fuel (gasoline) to provide lubrication for the various engine parts beneath the piston. This, of course, is not required in the apparatus of the present invention, since the gearcase is a sealed unit, separate from the portion of the cylinder 60 and the cylinder assembly 40 beneath the piston 230.

It will be noted that the hypocycloid gear apparatus of the present invention provides for a generally linear movement of the piston rod 200 and also of the exhaust valve rod 250, which is coaxially aligned with the piston rod 200 and is appropriately secured thereto. The hypocycloid gearing, including the pinion gears 150 and 152 moving within the fixed ring gears 34 and 38, respectively, describe circles as they move in the ring gears. However, any point on the pitch circle of the pinions 150 and 152 remains fixed in a straight line due to the geometry of the pinions 150 and 152 with respect to their ring gears 34 and 38.

The center axis or longitudinal axis of the piston rod 200, and of the exhaust valve rod 250, pivots at or on the pitch circle of the pinion shaft 142. See FIGS. 4A, 4B, 4C, 4D, and 4E, which will be discussed in detail below. A linear movement of the piston rod 200 is accordingly accomplished.

Obviously, with only linear movement of the piston rod 200, there is substantially less wear and tear on the rod 200 and on its seal 276 in the plate 16. There is also substantially less wear on the piston 230, and on its self-lubricating seal rings since there are no side forces involved. This in turn substantially diminishes the wear within the cylinder 60.

It will be noted that the only timing required of the engine is with the spark plug 78, the fuel injector 96, and with the intake valve 92, provided the valve 92 is not a reed valve, and provided fuel injection is used instead of carburetion. If the valve 92 is a reed valve, it simply closes when the pressure within the cylinder 60 beneath the piston 230, as transmitted through the transfer ports 62 and to the intake conduit 90, is greater than the upstream pressure which causes the reed valve to open.

The exhausting of the combustion gases is timed in simple response to the movement of the piston rod 200 and the exhaust rod 250 secured to the piston rod 200. A simple geometric or arithmetic relationship exists, as defined by the location of the exhaust ports 82 in the exhaust cylinder 80 with respect to the length or height of the exhaust rod 250. Changing the vertical location of the rod 250 by changing the height or length of the rod 250 changes the relationship with or by the degree of output shaft rotation.

It will also be noted, as briefly mentioned above, that there is a unidirectional flow through the cylinder 60. From the cylinder 60 beneath the piston 230, the partially compressed air charge moves upwardly through the intake or transfer ports 62 into the cylinder 60 above the piston 230. The exhaust ports 82 are now uncovered, and the flow of the exhaust gases, from the firing of the spark plug and the resulting combustion, extends in an upwardly direction. Thus, there is a unidirectional flow of both the incoming air charge and the outgoing exhaust gases. Fuel is then injected just prior to the closing of the ports.

FIGS. 4A, 4B, 4C, 4D, and 4E are sequential schematic representations illustrating the mechanical movement involved in the hypocycloid gearing of the apparatus of the present invention and showing the accompanying piston movement. For the following discussion, the primary reference will be the clockwise rotation of the output shaft 100. Obviously, the shaft 100 moves in response to movement of the piston 230 and the shaft 200 and the associated elements as transmitted to the shaft 100. However, the understanding of the apparatus may best be understood by reference in FIGS. 4A, 4B, 4C, 4D, and 4E to the rotation of the shaft 100.

Figure 4A:
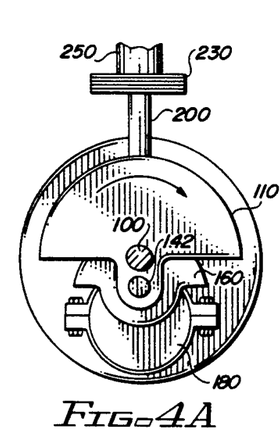
FIGS. 4A, 4B, 4C, 4D, and 4E are simplified schematic representations of the sequential operating mechanism positions for the apparatus of the present invention.

In FIG. 4A, the piston 230 is at bottom dead center, and its counterweight 160 is at its top position. The counterweight 110 for the output shaft 100 is also at its top position.

Figure 4B:
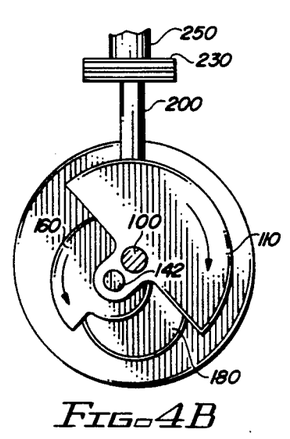

As the shaft 100 rotates clockwise through about forty five degrees, to the position shown in FIG. 4B, the counterweight 110 also moves the same amount. The counterweight 160 moves forty five degrees counterclockwise and the piston 230 moves upwardly.

Figure 4C:
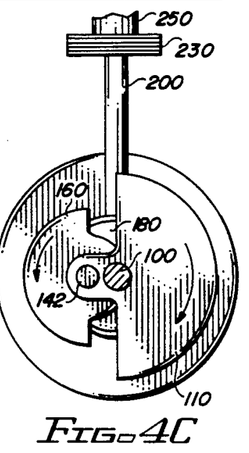

In FIG. 4C, the shaft 100 and its counterweight continues to move clockwise, and is now ninety degrees from the position shown in FIG. 4A. The counterweight 160 is also ninety degrees from its position shown in FIG. 4A, but its movement is counterclockwise. The piston 230 is now at its halfway location, as also shown in FIG. 2.

Figure 4D:
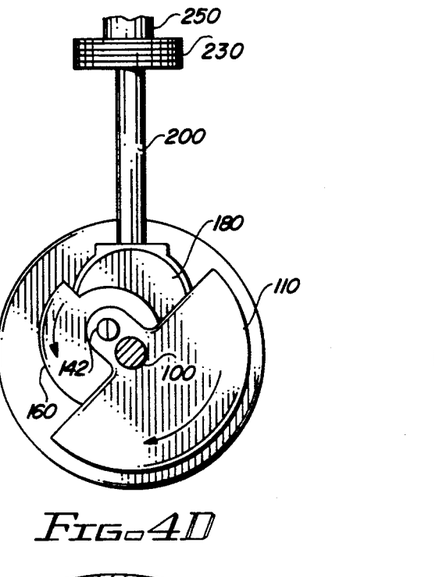
Figure 4E:
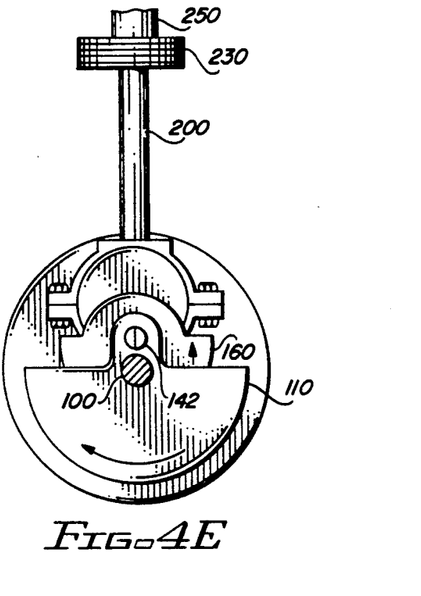

FIGS. 4D and 4E continue the clockwise rotation of the shaft 100 by a forty five degree increment. In FIG. 4E, the piston is at its top dead center position and the shaft 100 has moved through a total of one hundred eighty degrees from the initial position shown in FIG. 4A.

Figure 5:
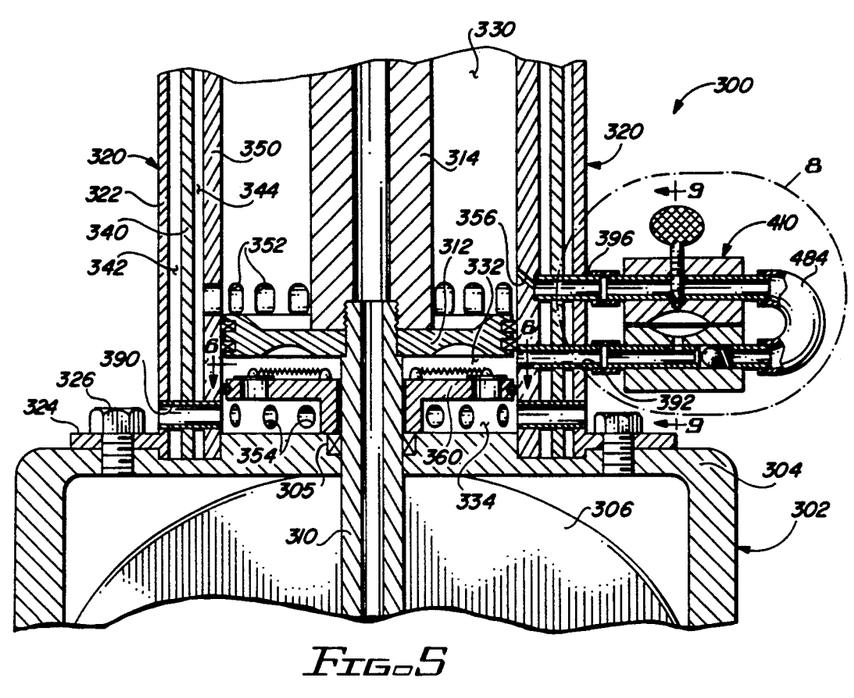
FIG. 5 is a view in partial section of an alternate embodiment of the apparatus of the present invention.

An alternate embodiment of the apparatus illustrated particularly in FIGS. 1A, 1B, and 2, is illustrated in FIGS. 5, 6, 7, 8, and 9. The alternate embodiment includes different structure for the air intake and for the fuel injection system from that discussed above. FIG. 5 is a view in partial section through internal combustion engine apparatus 300. The internal combustion engine apparatus 300 includes the essential elements discussed above in conjunction with the engine apparatus 10 except for the air intake elements and the fuel injection elements. For clarity, FIG. 5 comprises only a fragmentary view of the engine apparatus 300. The engine apparatus 300 includes a gear case 302 which is substantially identical to the gear case 12, discussed above. The gear case 302 includes a top plate 304 to which is secured a cylinder assembly 320. A portion of a gear plate 306 is shown disposed within and appropriately secured to the gear case 302.

A portion of a piston rod 310 is shown disposed in the gear case 302 and extending through an appropriate seal 305 in the top plate 304 and into the cylinder assembly 320.

The cylinder assembly 320 is substantially identical to the cylinder assembly 40, discusses above, in overall construction with the differences as will be discussed in detail below. The cylinder assembly 320 includes an outer cylinder 322, a middle cylinder 340, and an inner cylinder 350. The outer cylinder 322 includes a plurality of outwardly extending bolt flanges 324, and a plurality of screws 326 are used to secure the outer cylinder 322 to the top plate 304. The screws 326 extend through the bolt flanges 324.

Between the outer cylinder 322 and the middle cylinder 324 is a transfer chamber 342. Between the middle cylinder 340 and the inner 350 is a transfer chamber 344. The inner cylinder 350 includes a plurality of upper air transfer apertures 352 and a plurality of lower transfer apertures 354. A fuel injection port 356 extends through the inner cylinder 350 to communicate with a combustion chamber 330. The combustion chamber 330 is disposed within the inner cylinder 350 and above a piston 312. The piston 312 is appropriately secured to the piston rod 310. Extending upwardly from the piston 312, and also appropriately secured to the piston rod 310 is an exhaust valve rod 314. Again, the piston rod, the piston, the exhaust valve rod, and the various cylinders of the cylinder assembly 320 are comparable to their respective elements discussed above in conjunction with the engine apparatus 10. The difference between the engine apparatus 10 and the engine apparatus 300, as indicated, is in the intake system and in the fuel injection system.

Figure 6:
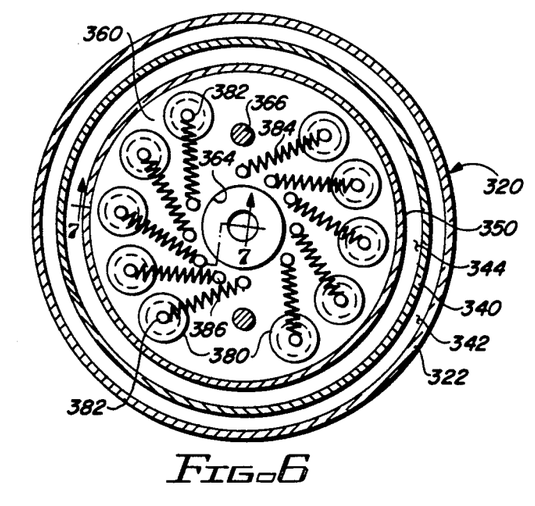
FIG. 6 is a view in partial section taken generally along line 6—6 of FIG. 5.
Figure 7:
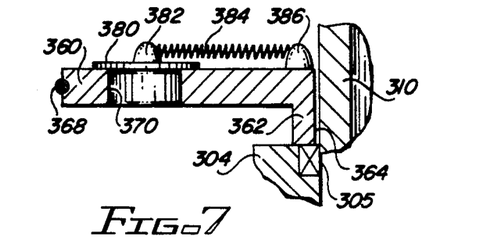
FIG. 7 is a view in partial section taken generally along line 7—7 of FIG. 6.

Spaced apart from the top plate 304 is a plate 360. The construction of the plate 360 is shown in detail in FIGS. 6 and 7, as well as in FIG. 5. The plate 360 is disposed above the lower transfer apertures 354 of the inner cylinder 350. The plate 360 includes a center hub 362 which extends downwardly to support the plate 360 on the top wall 304. A bore 364 extends through the hub 362. The bore 364 has a diameter which is greater than the diameter of the piston rod. The piston rod 310 extends through the bore 364. As best shown in FIG. 6, the plate 360 is secured to the top plate 304 by a plurality of screws 366.

The sealing of the plate 360 relative to the inner cylinder 350 and to the gear case 302 is accomplished by an O-ring 368 disposed in a groove in the outer periphery of the plate 360 and by the bearing seal 305 in the top wall 304 of the gear case 302. The bearing seal 305 in the top plate 304 also seals the piston rod 310. A gasket, not shown, may also be used between the bottom of the hub 362 and the top of the plate 302 and the seal 305. Such is well known and understood in the art.

A plurality of apertures 370 extends through the plate 360. Air flow through the apertures 370 is controlled by a plurality of reed valves 380. Each aperture 370 is covered by a reed valve 380. The reed valves are secured to the plate 370 by means of a tension spring 384 which is appropriately secured to both a reed valve 380 and to the plate 360 appropriately, as by solder or welds 382 and 386, respectively.

Between the piston 312 and the plate 360 is a compression chamber 332. Between the top plate 304 and plate 360 is an intake chamber 334. Air flows into the intake chamber 334 through a plurality of intake conduits 390 which communicate with the apertures 354.

As the piston 312 moves upwardly, air is drawn into the chamber 334 and from the chamber 334, the air flows through the apertures 370 and into the compression chamber 332. The atmospheric pressure in the chamber 334, and the lower pressure in the chamber 332 as the piston moves upwardly causes the reed valves 382 to open.

As the piston 312 moves downwardly, the air beneath the piston 312 and in the compression chamber 332 is compressed. The compressed air flows through the upper transfer ports or apertures 352 and into the transfer chamber 344 and into the transfer chamber 342. The reed valves 382, of course, close when the pressure in the chamber 332 exceeds the atmospheric pressure in the chamber 334.

Figure 8:
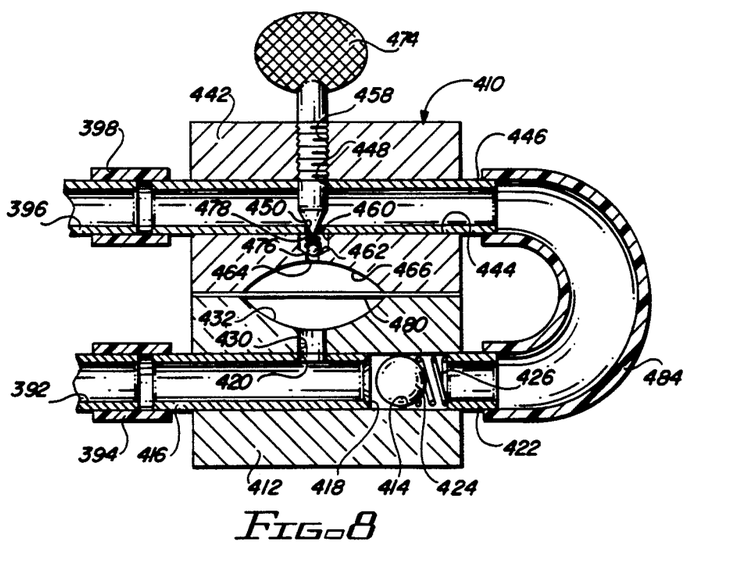
FIG. 8 is an enlarged view in partial section taken generally from circle 8 of FIG. 5.
Figure 9:
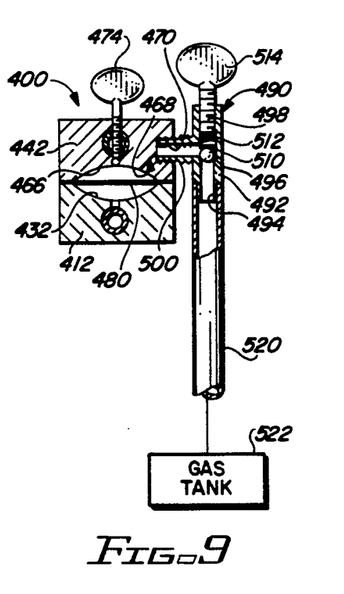
FIG. 9 is a view in partial section taken generally along line 9—9 of FIG. 5.

When the piston 312 passes the bottom of the transfer ports 352, there is residual air remaining in the compression chamber 332. This air is further compressed and is used to inject fuel into the combustion chamber 330. The fuel injection elements are illustrated in FIGS. 5, 8, and 9. For the following discussion, reference will primarily be made to FIGS. 8 and 9, as well as to FIG. 5.

A fuel injection pump conduit 392 extends through the three cylinders of the cylinder assembly, namely the inner cylinder 350, the middle cylinder 340, and the outer cylinder 322. The conduit 392 communicates directly with the chamber 332. The conduit 392 extends to a fuel injection pump 410. The fuel injection pump 410 includes a lower block 412 and an upper block 442, with a diaphragm 480 disposed between the two blocks. The blocks are appropriately secured together, with the diaphragm 480 between them for pumping purposes. This will be discussed below in detail.

A bore 414 extends through the lower block 412. A compressed air conduit 416 is disposed in the bore 414. The conduit 416 extends slightly outwardly from the lower block 412 and is aligned with the conduit 392. A flexible conduit 394 connects the conduit 392 and the conduit 416.

Within the bore 414, the conduit 416 terminates in a tapered inner end 418. An aperture 420 extends through the conduit 416 and communicates with a bore 430 in the lower block 412.

Another conduit 422 is also disposed in the bore 414 and extends outwardly from the block 412. The inner end of the conduit 422 is spaced apart from the tapered inner end 418 of the conduit 416. Between the tapered end 418 and the inner end of the conduit 422 is a ball check element 424 and a compression spring 426. The tapered inner end 418 comprises a valve seat which receives the ball 424. The ball 424 comprises a ball check element and the ball check element is biased away from the conduit 422 by the spring 426. The spring 426 extends between the inner end of the conduit 422 and the ball 424. The spring 426 prevents the ball 424 from seating against the conduit 422. The ball check element 424 acts as a one-way check valve to prevent the flow of air into the conduit 418 except when the ball element 424 is off its seat 418 under the force of compressed air from the chamber 332.

The bore 430, which is aligned with the aperture 420, extends to a concave depression 432. The concave depression 432 extends into the block 412 from a top face of the block. The top face of the lower block 412 is matingly aligned with a bottom face of an upper block 442.

The upper block 442 includes a bore 444 extending through the block 442 generally parallel to the bore 414 of the lower block 412. A conduit 446 extends in the bore 444 and extends slightly outwardly from the block 442. The conduit 446 is appropriately secured to the block 442 just as the conduits 416 and 422 are appropriately secured to the lower block 412.

Extending through the conduit 446 is an upper aperture 448. Aligned with the aperture 448 is a lower aperture 450 which also extends through the conduit 446. The aperture 448 is aligned with an upper tapped bore 458 which extends through the upper portion of the block 442 to communicate with the aperture 448 and the conduit 446. Aligned with the aperture 448 and the bore 458 is the lower aperture 450. The lower aperture 450 communicates with a bore 460 in the block 412. The bore 460 includes a lowered tapered portion 462 which comprises a valve seat and which in turn communicates with a lower bore 464. The lower bore 464 has a substantially smaller diameter than does the bore 460. The tapered portion 462 comprises a transition between the larger diameter bore 460 and the smaller diameter bore 464.

The bore 464 extends through an upper concave depression 466 which extends upwardly in the block 442 from the lower face of the block. The concave depression 466 comprises generally a mirror image of the concave depression 432 in the lower block 412. The diaphragm 480 is appropriately disposed between the lower block 412 and the upper block 442 and essentially divides the two depressions 432 and 466 from each other. The two depressions, with the diaphragm, comprise pumping chambers.

As best shown in FIG. 9, a fuel intake port 468 extends from the concave depression 466 to a tapped bore 470. A fuel valve assembly 490 is secured to the fuel injection pump 410 at the tapped bore 470.

A needle valve 474 extends through the aligned bore 458, aperture 448, and the aperture 450. Within the bore 460, below the aperture 450, is a ball check element 476 and a compression spring 478. The ball check element 476 is disposed in the tapered portion 462, which comprises a valve seat for the ball 476. The ball 476 comprises a check valve, and the spring 478 biases the ball 476 away from the aperture 450.

The fuel valve assembly 490 includes a valve body 492 with a bore 494 extending through it. The upper portion of the bore 494 comprises a tapered valve seat 496. A threaded connector 500 extends outwardly from the valve body 494 and communicates with the bore 494 and the seat 496. The threaded connector 500 extends into the tapped aperture 470 of the upper block 442 of the pump 410.

Extending downwardly into the valve body 492, aligned with the bore 494, is a threaded bore 498. A ball element 510 is disposed in the upper portion of the bore 494 and on the seat 496. A compression spring 512 is disposed above the ball 510. An adjustable screw 514 is disposed in the threaded bore 498. The bottom of the adjustable screw 514 bears against the spring 512. The bias of the spring 512 is accordingly adjusted by the screw 514.

A fuel conduit 520 extends from the valve body 492 to a fuel tank 522. Fuel flows from the tank 522 through the conduit 520 and the fuel valve assembly 490 in response to low pressure of the diaphragm 480 in the depression 466. The flow of fuel depends, of course, on the unseating of the ball 496 in response to the lowered pressure. Fuel flow accordingly is through the bore 494 and through the connector element 500, the fuel intake port 468, and into the chamber defined by the upper depression 466 and the diaphragm 480.

A connecting conduit 484 extends between the conduit 422 and the conduit 446.

As the piston 312 moves upwardly, low pressure in the chamber 332 will be impressed on the lower chamber in the lower block 412 defined by the depression 432 and the diaphragm 480. The diaphragm 480 accordingly will be drawn downwardly, and the result will be a low pressure situation in the upper chamber defined by the diaphragm 480 and the depression 466 in the upper block 442. The low pressure in the upper pumping chamber, as the chamber in the depression 66 above the diaphragm 480 may be referred to, will cause the ball 476 to seat against its seat 462. The low pressure will also cause the ball 424 to be seated against its seat 418. Accordingly, fuel will flow from the tank 522, the conduit 20, the bore 494, past the ball check 510, through the conduit 500, and through the fuel intake port 468 into the upper pumping chamber above the diaphragm 480.

When the piston 312 moves downwardly, the compressed air in the compression chamber 332 will be transferred through the apertures 352, as discussed above. When the piston 312 moves below the transfer ports or apertures 352, residual air is further pressurized and is transmitted through the conduit 392 to the conduit 416. The pressurized air will flow through the aperture 420 and the bore 430 to the lower pumping chamber, which is defined by the depression 432 and the diaphragm 480. Some of the pressure will also flow into the bore 414 and the conduit 422 and the connecting conduit 484 into the conduit 46. The compressed air will, of course, move the ball check 24 off its seat 418.

In the conduit 446, the pressurized air will flow past the aperture 450 and will pick up fuel flowing from the upper pumping chamber through the bore 464 and the bore 460, through the aperture 450 and into the conduit 446.

The compressed air flowing through the aperture 420 in the conduit 416 and through the bore 430 into the lower pumping chamber beneath the diaphragm 480 will cause the diaphragm 480 to move upwardly, thus pumping outwardly from the upper pumping chamber a quantity of fuel. The pumped fuel, as indicated above, will flow through the bores 464 and 460, through the aperture 450, and into the air stream moving in the conduit 446 from the conduit 484 and ultimately from the chamber 332. The fuel and air then flow from the conduit 446 into a fuel injection conduit 396 which extends through the outer cylinder 322 and the middle cylinder 340 and communicates with the fuel injection port 356 in the inner cylinder 350. A flexible connector conduit 398 couples the conduits 446 and 396 together.

It will be noted that there are two control elements for the fuel flow out of the fuel injection pump 410 and through the fuel injection port 356 into the combustion chamber 330. The first control is the control impressed by the adjustable screw 514 in the fuel valve assembly 490. The force of the spring 512 against the ball 510 controls the extent to which a vacuum pressure or low pressure is required in order to allow fuel to flow from the gas tank 522 and through the conduit 520 to the pumping chamber above the diaphragm 480 in the upper block 442 through the fuel intake port 468. The less pressure on the ball 510, the greater will be the fuel flow, and the greater spring pressure on the ball 510, the less fuel will flow under the same pressure conditions.

The second control is the needle valve 474 which controls the fuel flow through the aperture or orifice 450 from the bores 464 and 460 from the upper pumping chamber. The tip of the needle valve 474 extends into the orifice or aperture 450 in the conduit 446 and accordingly controls the fuel flow out of the upper pumping chamber and into the conduit 446. Again, the greater the opening in the aperture or orifice, the greater will be the fuel flow. Conversely, the smaller the opening, the less will be the fuel flow.

It will be understood that the ball check elements 424 and 476 are not control elements, but merely are ball check elements or one way check valves which essentially prevent back flow when the piston 312 is moving upwardly on its compression stroke.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, within the limits only of the true spirit and scope of the invention.

What I claim is:

1. Two-stroke cycle engine apparatus having linear piston rod movement and hypocycloid gearing connecting the piston rod and an output shaft, comprising, in combination:
    gearcase means, including
        a housing in which the hypocycloid gearing is disposed, having a top wall, and
        a piston rod connected to the hypocycloid gearing and extending through the top wall;
    cylinder means secured to the gearcase means, including
        an inner cylinder,
        a piston movable in the inner cylinder and connected to and movable with the piston rod for providing compression within the inner cylinder,
    means for providing a flow of air into the cylinder means to be compressed by the piston;
    plate means in the inner cylinder and beneath the piston;
    aperture means in the plate means through which the flow of air moves into the inner cylinder beneath the piston;
    valve means for controlling the flow of air through the aperture means;
    means for providing fuel into the cylinder means; and
    means for combusting the fuel and air in the inner cylinder.

2. The apparatus of claim 1 in which the cylinder means further includes
    a middle cylinder,
    an outer cylinder spaced apart from the middle cylinder, and means for transferring air compressed by the piston in the inner cylinder beneath the piston to the middle cylinder and the outer cylinder and from the outer and middle cylinders to the inner cylinder above the piston.

3. The apparatus of claim 2 in which the means for transferring air includes a plurality of transfer slots extending through the inner cylinder.

4. The apparatus of claim 2 in which the cylinder means further includes a plurality of alternating flutes and ribs on the inner cylinder and air flows into the flutes as the air is transferred.

5. The apparatus of claim 4 in which the middle cylinder is disposed against the ribs of the inner cylinder for transferring heat from the inner cylinder to the middle cylinder.

6. The apparatus of claim 2 in which the cylinder means further includes a cylinder head and the middle cylinder includes a top rim spaced apart from the cylinder head, and the air transferred between the middle cylinder and the outer cylinder flows between the top rim and the cylinder head.

7. The apparatus of claim 1 in which the plate means includes a plate and a plurality of apertures extending through the plate through which the air flows into the inner cylinder beneath the piston.

8. The apparatus of claim 7 in which the valve means includes a plurality of valves corresponding to the plurality of apertures extending through the plate.

9. The apparatus of claim 1 in which the means for providing fuel into the cylinder means includes
    a housing,
    a diaphragm in the housing dividing the housing into a first and a second chamber,
    means for providing fuel in the first chamber of the housing,
    first conduit means extending between the first chamber and the inner cylinder above the piston, and
    means for providing compressed air in the second chamber for moving the diaphragm to pump fuel through the first conduit means in response to movement of the piston.

10. The apparatus of claim 9 in which the means for providing compressed air in the second chamber includes second conduit means extending from the inner cylinder above the plate means and communicating with the second chamber.

11. The apparatus of claim 10 in which the means for providing fuel into the cylinder means further includes third conduit means extending between the first conduit means and the second conduit means, and the compressed air flows in the second conduit means for moving the diaphragm and in the third and first conduit means for helping to vaporize and spray the fuel into the inner cylinder above the piston.

12. The apparatus of claim 1 in which the cylinder means further includes a middle cylinder and an outer cylinder spaced apart from the middle cylinder, and the space between the outer cylinder and the middle cylinder communicates with the inner cylinder and comprises a transfer plenum for receiving air compressed in the inner cylinder beneath the piston.

13. The apparatus of claim 12 in which the inner cylinder of the cylinder means includes a plurality of flutes and ridges, and the middle cylinder contacts the ridges of the inner cylinder, and the flutes communicate with the space between the outer cylinder and middle cylinder for receiving and transferring the compressed air and the flutes comprise a continuation of the transfer plenum.

14. Two-stroke cycle engine apparatus having linear piston rod movement and hypocycloid gearing connecting the piston rod and an output shaft, comprising, in combination:

gearcase means, including
  a housing in which the hypocycloid gearing is disposed, having a top wall, and
  a piston rod connected to the hypocycloid gearing and extending through the top wall;
cylinder means secured to the gearcase means, including
  a first cylinder, and
  a piston movable in the first cylinder and connected to and movable with the piston rod for providing compression within the first cylinder;
means for providing air in the cylinder means to be compressed by the piston;
means for providing fuel into the first cylinder, including,
  a first chamber,
  a diaphragm communicating with the first chamber for alternately pumping fuel into and out of the first chamber,
  a second chamber communicating with the diaphragm for receiving air at different pressures for moving the diaphragm to pump the fuel,
  conduit means, including
    a first portion communicating between the first chamber and the first cylinder through which fuel flows out of the first chamber and into the first cylinder in response to movement of the diaphragm, and
    a second portion communicating between the first cylinder below the piston and the second chamber for providing air at different pressures to move the diaphragm to pump fuel into the first chamber and to pump fuel out of the first chamber and into the first portion of the conduit means and into the first cylinder; and
means for combusting the fuel and air in the first cylinder.

15. The apparatus of claim 14 in which the conduit means further includes a third portion extending between the first and second portions for providing a flow of pressurized air in response to movement of the piston from the second conduit portion to the first conduit portion for helping to vaporize the fuel from the first chamber as the fuel flows in the first conduit portion to the first cylinder.

16. The apparatus of claim 14 in which the cylinder means further includes
  a plate in the first cylinder and beneath the piston,
  a chamber between the plate and the top wall of the gearcase means,
  aperture means extending through the plate through which air flows from the chamber to the first cylinder below the piston in response to movement of the piston,
  valve means for controlling the flow of air out of the chamber through the aperture means, and
  means for transferring air from the beneath the first piston to the first cylinder above the piston in response to movement of the piston.

* * * * *